(12) United States Patent
Luo et al.

(10) Patent No.: US 12,557,067 B2
(45) Date of Patent: Feb. 17, 2026

(54) COMMUNICATION METHOD AND APPARATUS FOR DETERMINING A LOCATION OF A NON-TERRESTRIAL DEVICE

(71) Applicant: Huawei Technologies Co., Ltd., Shenzhen (CN)

(72) Inventors: Hejia Luo, Hangzhou (CN); Xiaolu Wang, Hangzhou (CN); Ying Chen, Hangzhou (CN); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 420 days.

(21) Appl. No.: 18/165,103

(22) Filed: Feb. 6, 2023

(65) Prior Publication Data

US 2023/0189200 A1    Jun. 15, 2023

Related U.S. Application Data

(63) Continuation of application No. PCT/CN2021/111034, filed on Aug. 5, 2021.

(30) Foreign Application Priority Data

Aug. 7, 2020    (CN) .................... 202010791008.X

(51) Int. Cl.
*H04W 64/00* (2009.01)
*H04B 7/185* (2006.01)
*H04W 84/06* (2009.01)

(52) U.S. Cl.
CPC ........ *H04W 64/003* (2013.01); *H04B 7/1855* (2013.01); *H04W 84/06* (2013.01)

(58) Field of Classification Search
None
See application file for complete search history.

(56) References Cited

U.S. PATENT DOCUMENTS

| 2019/0082409 A1 | 3/2019 | Tang |
| 2021/0212009 A1* | 7/2021 | Wu ..................... H04W 56/002 |
| 2021/0266809 A1 | 8/2021 | Chen et al. |

(Continued)

FOREIGN PATENT DOCUMENTS

| CN | 111132254 A | 5/2020 |
| WO | 2017143388 A1 | 8/2017 |

(Continued)

OTHER PUBLICATIONS

3rd Generation Partnership Project; Technical Specification Group Radio Access Network; Solutions for NR to support non-terrestrial networks (NTN) (Release 16). 3GPP TR 38.821 V16.0.0, Dec. 2019, total 140 pages.

(Continued)

*Primary Examiner* — German Viana Di Prisco
(74) *Attorney, Agent, or Firm* — Conley Rose, P.C.

(57) ABSTRACT

A communication method and apparatus, where a terminal device determines a location of an NTN device in an NTN. The method includes a network device sending system information to the terminal device, where the system information includes a location parameter of an NTN device, and where the system information is used to indicate time information of the location parameter.

20 Claims, 5 Drawing Sheets

(56) References Cited

U.S. PATENT DOCUMENTS

| | | | |
|---|---|---|---|
| 2021/0306869 A1* | 9/2021 | Wei | H04W 16/28 |
| 2022/0086715 A1* | 3/2022 | Hong | H04W 36/305 |
| 2022/0330187 A1* | 10/2022 | Cheng | H04W 56/004 |
| 2023/0164847 A1* | 5/2023 | Kim | H04W 74/0833 |
| | | | 370/329 |
| 2023/0397061 A1* | 12/2023 | Huang | H04W 36/0061 |
| 2023/0413141 A1* | 12/2023 | Määttänen | H04W 36/0061 |
| 2024/0022320 A1* | 1/2024 | Ji | H04W 56/009 |

FOREIGN PATENT DOCUMENTS

| | | |
|---|---|---|
| WO | 2017193333 A1 | 11/2017 |
| WO | 2019195410 A1 | 10/2019 |

OTHER PUBLICATIONS

Ericsson (Email discussion rapporteur):"Report of email discussion [107bis#67] [NR-NTN]." 3GPP TSG-RAN WG2 Meeting #108 Tdoc R2-1916391, Nov. 18-22, 2019. total 15 pages.
Loon et al:"HAPS-Satellite ephemeris broadcast." 3GPP TSG-RAN WG2 Meeting#111e R2-2006924, Aug. 17-28, 2020. total 2 pages.
Huawei et al:"Control Plane for IOT NTN." 3GPP TSG-RAN2 Meeting #116-e R2-2110480, Nov. 1-12, 2021, total 6 pages.
3GPP TS 36.331, V16.2.0, "3rd Generation Partnership Project; Technical Specification Group Radio Access Network; Evolved Universal Terrestrial Radio Access (E-UTRA); Radio Resource Control (RRC) Protocol specification (Release 16)," Technical Specification, Sep. 2020, 1081 pages.
3GPP TS 38.211 V16.2.0 "3rd Generation Partnership Project; Technical Specification Group Radio Access Network; NR; Physical channels and modulation (Release 16)," Technical Specification, Jun. 2020, 131 pages.
3GPP TS 38.213 V16.2.0, "3rd Generation Partnership Project; Technical Specification Group Radio Access Network; NR; Physical layer procedures for control (Release 16)," Technical Specification, Jun. 2020, 176 pages.
3GPP TS 38.321 V15.9.0, "3rd Generation Partnership Project; Technical Specification Group Radio Access Network; NR; Medium Access Control (MAC) protocol specification (Release 15)," Technical Specification, Jul. 2020, 78 pages.
3GPP TS 38.331 V16.1.0, "3rd Generation Partnership Project; Technical Specification Group Radio Access Network; NR; Radio Resource Control (RRC) protocol specification (Release 16)," Jul. 2020, 911 pages.
R1-1904650, Nokia et al., "Doppler Compensation, Uplink Timing Advance, Random Access and UE Location in NTN," 3GPP TSG RAN WG1 Meeting #96bis, Xi'an, China, Apr. 8-12, 2019, 15 pages, XP051699859.
R2-1913783, Huawei et al., Correction on parameter description of beamManagementSSB-CSI-RS in 38.306, 3GPP TSG-RAN WG2 Meeting #107bis, Chongqing, CN, Oct. 14-18, 2019, 5 pages.
Tdoc R2-1914195, Is revision of R2-1912597, Ericsson, Ephemeris data, 3GPP TSG-RAN WG2 #107bis, Chongqing, China, Oct. 14-18, 2019, 6 pages, XP051797961.
Tdoc R2-1916388, Ericsson et al., Remaining details on Random access for NTN, 3GPP TSG-RAN WG2 #108, Reno, Nevada, US, Nov. 18-22, 2019, 3 pages.
Tdoc R2-1916414, Ericsson, TP on remaining details on Random access for NTN, 3GPP TSG-RAN WG2 #108, Reno, Nevada, US, Nov. 18-22, 2019, 3 pages.

* cited by examiner

COMMUNICATION METHOD AND APPARATUS FOR DETERMINING A LOCATION OF A NON-TERRESTRIAL DEVICE

CROSS-REFERENCE TO RELATED APPLICATIONS

This application is a continuation of International Patent Application No. PCT/CN2021/111034, filed on Aug. 5, 2021, which claims priority to Chinese Patent Application No. 202010791008.X, filed on Aug. 7, 2020. The disclosures of the aforementioned applications are hereby incorporated by reference in their entireties.

TECHNICAL FIELD

This application relates to the field of communication technologies, and in particular, to a communication method and apparatus.

BACKGROUND

Currently, because a location of a non-terrestrial network (NTN) device may dynamically change in an NTN, a distance between a terminal device and the NTN device may dynamically change with the location of the NTN device, and a value of a timing advance (TA) of the terminal device also needs to dynamically change. Therefore, in the NTN, how to determine the TA is a problem that needs to be resolved currently.

SUMMARY

Embodiments of this application provide a communication method and apparatus, such that a terminal device determines a location of an NTN device in an NTN.

To achieve the foregoing objective, embodiments of this application provide the following technical solutions.

According to a first aspect, a communication method is provided, including the following. A network device sends system information to a terminal device. The system information includes a location parameter of an NTN device, and the system information is used to indicate time information of the location parameter.

In this embodiment, the network device sends the system information to the terminal device. The system information includes the location parameter of the NTN device, and the system information further indicates the time information of the location parameter. Therefore, the terminal device can determine, through calculation, or the like, a location parameter of the NTN device at a time point (for example, a moment t) other than a time point to corresponding to the location parameter. Further, the terminal device may calculate, based on information such as a location of the NTN device at the moment t and a location of the terminal device, a TA of sending uplink data by the terminal device at the moment t.

In a possible design, a predetermined time point in a modification period of the system information is used to indicate the time information of the location parameter.

In the design, it is considered that a predetermined time point in a modification period of first system information may be used as a timestamp of a location parameter of the NTN device in the first system information. Further, each time the network device sends the first system information to the terminal device, the first system information may include a location parameter of the NTN device at the predetermined time point in the modification period. Then, after receiving the first system information, the terminal device may obtain the predetermined time point based on an agreement, and further obtain time information of the location parameter of the NTN device.

In a possible design, the predetermined time point is a start time point or an end time point of the modification period of the system information, or any time point other than the start time point and the end time point.

In this implementation, the start time point of the modification period of the system information is used as a predetermined time point t0, to ensure that the moment t at which the uplink data is sent is always greater than the predetermined time point t0, that is, t−t0 is always a positive number, and reduce symbol overheads for storage.

In addition, the end time point of the modification period of the system information is used as the predetermined time point t0, to match an existing system information timestamp indication mechanism, and reduce overheads in an implementation process.

In a possible design, a predetermined time point of a system information (SI) window carrying the system information is used to indicate the time information of the location parameter.

In the design, it is considered that a predetermined time point of a SI window carrying the first system information may be used as the timestamp of the location parameter of the NTN device in the first system information. Further, each time the network device sends the first system information to the terminal device, the first system information may include the location parameter of the NTN device at the predetermined time point. Then, after receiving the first system information, the terminal device may obtain the predetermined time point based on the agreement, and further obtain the time information of the location parameter of the NTN device.

In a possible design, the predetermined time point is a boundary moment of a nearest system frame after the SI window carrying the system information ends.

In the design, the boundary moment of the nearest system frame after the SI window carrying the system information ends is used as the predetermined time point, such that after receiving the first system information, the terminal device can obtain the predetermined time point based on an agreement, and further obtain the time information of the location parameter of the NTN device.

In a possible design, the system information further includes time information of an end location of a SI window carrying a predetermined system information block (SIB); and the time information of the end location of the SI window carrying the predetermined SIB is the time information of the location parameter.

In the design, the boundary moment of the nearest system frame after the SI window carrying the system information ends is used as the predetermined time point, such that after receiving the first system information, the terminal device can obtain the predetermined time point based on an agreement, and further obtain the time information of the location parameter of the NTN device.

In a possible design, the method further includes: The network device sends first indication information to the terminal device. The first indication information is used to indicate a reference time unit, time information of the reference time unit is the time information of the location parameter, and the reference time unit is a system frame or a slot.

In the design, the network device sends the first indication information to the terminal device, such that the terminal device can determine a time point that is of the location parameter of the NTN device and that is included in the first system information. In addition, it is considered that the network device may send the system information to the terminal device in two manners: a broadcast manner and an on-demand manner. In the on-demand manner, the network device sends the system information to the terminal device based on a request of the terminal device. Therefore, in the on-demand manner, it is not easy to indicate the time point of the location parameter of the NTN device using a system time number. When the design is applied to a scenario in which transmission is performed in the on-demand manner, an indication of binding of the time information of the location parameter of the NTN device and the system time number may be avoided, such that an implementation is more flexible.

In a possible design, the method further includes the following. The network device sends a short message to the terminal device. An updating label of the system information in the short message remains unchanged when the location parameter of the NTN device changes.

In the design, an updating label of the first system information in the short message remains unchanged when the location parameter of the NTN device changes. Therefore, the terminal device is not notified that an SIB corresponding to the first system information changes, and therefore, does not need to read the SIB.

In a possible design, a field valueTag corresponding to the system information remains unchanged when the location parameter of the NTN device changes.

In the design, the terminal device is not notified that the SIB corresponding to the first system information changes, and therefore, does not need to read the SIB.

In a possible design, the location parameter of the NTN device includes a location of the NTN device; or the location parameter of the NTN device includes a location of the NTN device and motion information of the NTN device.

In the design, after the network device sends the first system information to the terminal device, the terminal device may determine the location of the NTN device, the motion information of the NTN device, and a moment t0 corresponding to the location parameter. Then, the terminal device may determine a location of the NTN device at another moment other than t0 based on the location of the NTN device and the motion information of the NTN device.

In a possible design, the location parameter of the NTN device includes an Earth-centered, Earth-fixed (ECEF) coordinate system parameter (e.g., an ECEF-based location parameter) of the NTN device.

In the design, an ECEF-based location representation method is widely applied, and many references are given to product development. Therefore, an implementation is easy.

In a possible design, the location parameter of the NTN device includes longitude and latitude of the NTN device and a height of the NTN device.

In the design, the height of the NTN device may be represented based on an altitude. Herein, because an earth radius (6371 kilometers (km)) accounts for a majority of a height value of the NTN device (for example, a low Earth orbit (LEO) satellite), for example, 6971 km, the height of the NTN device is represented based on the altitude, to significantly reduce bit overheads existing during information transmission.

In a possible design, the system information further includes an offset of a timing advance TA of the terminal device and change information of the offset.

In the design, after receiving the system information, the terminal device may obtain the offset of the TA of the terminal device and the change information of the offset, such that the terminal device determines, based on the offset and the change information of the offset, the TA of sending the uplink data.

In a possible design, the network device is the NTN device; or the network device is an access network device, and the NTN device is a relay device between the access network device and the terminal device.

According to a second aspect, a communication method is provided, including: A terminal device receives system information (SI) from a network device. The system information includes a location parameter of a NTN device, and the system information is used to indicate time information of the location parameter.

In a possible design, a predetermined time point in a modification period of the system information is used to indicate the time information of the location parameter.

In a possible design, the predetermined time point is a start time point or an end time point of the modification period of the system information, or any time point other than the start time point and the end time point.

In a possible design, a predetermined time point of a SI window carrying the system information is used to indicate the time information of the location parameter.

In a possible design, the predetermined time point is a boundary moment of a nearest system frame after a SI window carrying the location parameter of the system information ends.

In a possible design, the method further includes: The terminal device receives first indication information from the network device. The first indication information is used to indicate a reference time unit, time information of the reference time unit is the time information of the location parameter, and the reference time unit is a system frame or a slot.

In a possible design, the method further includes: The terminal device receives a short message from the network device. An updating label of the system information in the short message remains unchanged when the location parameter of the NTN device changes.

In a possible design, a field valueTag corresponding to the system information remains unchanged when the location parameter of the NTN device changes.

In a possible design, the location parameter of the NTN device includes a location of the NTN device; or the location parameter of the NTN device includes a location of the NTN device and motion information of the NTN device.

In a possible design, the location parameter of the NTN device includes an ECEF coordinate system parameter (e.g., an ECEF-based location parameter) of the NTN device.

In a possible design, the location parameter of the NTN device includes longitude and latitude of the NTN device and a height of the NTN device.

In a possible design, the system information further includes an offset of a timing advance TA of the terminal device and change information of the offset.

In a possible design, the network device is the NTN device; or the network device is an access network device, and the NTN device is a relay device between the access network device and the terminal device.

According to a third aspect, a communication apparatus is provided, including a sending unit, configured to send system information to a terminal device. The system information includes a location parameter of a NTN device, and the system information is used to indicate time information of the location parameter.

In a possible design, a predetermined time point in a modification period of the system information is used to indicate the time information of the location parameter.

In a possible design, the predetermined time point is a start time point or an end time point of the modification period of the system information, or any time point other than the start time point and the end time point.

In a possible design, a predetermined time point of a SI window carrying the system information is used to indicate the time information of the location parameter.

In a possible design, the predetermined time point is a boundary moment of a nearest system frame after the SI window carrying the system information ends.

In a possible design, the system information further includes time information of an end location of a SI window carrying a predetermined SIB; and the time information of the end location of the SI window carrying the predetermined SIB is the time information of the location parameter.

In a possible design, the sending unit is further configured to send first indication information to the terminal device. The first indication information is used to indicate a reference time unit, time information of the reference time unit is the time information of the location parameter, and the reference time unit is a system frame or a slot.

In a possible design, the sending unit is further configured to send a short message to the terminal device. An updating label of the system information in the short message remains unchanged when the location parameter of the NTN device changes.

In a possible design, a field valueTag corresponding to the system information remains unchanged when the location parameter of the NTN device changes.

In a possible design, the location parameter of the NTN device includes a location of the NTN device; or the location parameter of the NTN device includes a location of the NTN device and motion information of the NTN device.

In a possible design, the location parameter of the NTN device includes an ECEF-based location parameter of the NTN device.

In a possible design, the location parameter of the NTN device includes longitude and latitude of the NTN device and a height of the NTN device.

In a possible design, the system information further includes an offset of a timing advance TA of the terminal device and change information of the offset.

In a possible design, the communication apparatus is built into the NTN device; or the communication apparatus is built into an access network device, and the NTN device is a relay device between the access network device and the terminal device.

According to a fourth aspect, a communication apparatus is provided, including a receiving unit, configured to receive SI from a network device. The system information includes a location parameter of a NTN device, and the system information is used to indicate time information of the location parameter.

In a possible design, a predetermined time point in a modification period of the system information is used to indicate the time information of the location parameter.

In a possible design, the predetermined time point is a start time point or an end time point of the modification period of the system information, or any time point other than the start time point and the end time point.

In a possible design, a predetermined time point of a SI window carrying the system information is used to indicate the time information of the location parameter.

In a possible design, the predetermined time point is a boundary moment of a nearest system frame after a SI window carrying the location parameter of the system information ends.

In a possible design, the receiving unit is further configured to receive first indication information from the network device. The first indication information is used to indicate a reference time unit, time information of the reference time unit is the time information of the location parameter, and the reference time unit is a system frame or a slot.

In a possible design, the receiving unit is further configured to receive a short message from the network device. An updating label of the system information in the short message remains unchanged when the location parameter of the NTN device changes.

In a possible design, a field valueTag corresponding to the system information remains unchanged when the location parameter of the NTN device changes.

In a possible design, the location parameter of the NTN device includes a location of the NTN device; or the location parameter of the NTN device includes a location of the NTN device and motion information of the NTN device.

In a possible design, the location parameter of the NTN device includes an ECEF-based location parameter of the NTN device.

In a possible design, the location parameter of the NTN device includes longitude and latitude of the NTN device and a height of the NTN device.

In a possible design, the system information further includes an offset of a timing advance TA of the terminal device and change information of the offset.

In a possible design, the network device is the NTN device; or the network device is an access network device, and the NTN device is a relay device between the access network device and the terminal device.

According to a fifth aspect, a communication apparatus is provided, including at least one processor and an interface circuit. The at least one processor is configured to: communicate with another apparatus using the interface circuit, and perform the method provided in the first aspect or the second aspect.

According to a sixth aspect, a chip is provided. The chip includes a processor, and when the processor executes computer program instructions, the chip is enabled to perform the method provided in the first aspect or the second aspect.

According to a seventh aspect, a computer-readable storage medium is provided, including computer software instructions. When the computer software instructions run in a data transmission apparatus or in a chip built into the data transmission apparatus, the data transmission apparatus is enabled to perform the method provided in the first aspect or the second aspect.

For the technical effects brought by any design method in the second aspect to the seventh aspect, refer to the technical effects brought by different design manners in the first aspect. Details are not described herein again.

DESCRIPTION OF EMBODIMENTS

Figure 1:
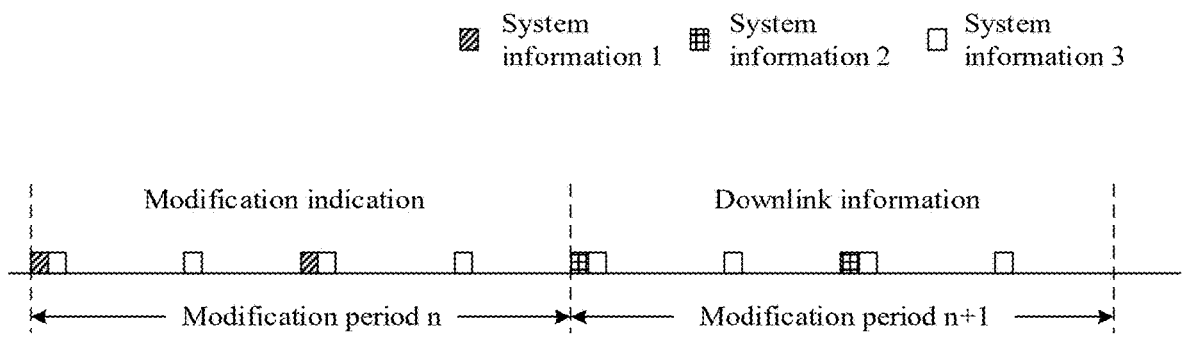
FIG. 1 is a schematic diagram of a modification period of system information according to an embodiment of this application.

The following describes technical solutions in embodiments of this application with reference to the accompanying drawings in embodiments of this application. In addition, to clearly describe the technical solutions in embodiments of this application, terms such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference. In embodiments of this application, the term "example", "for example", or the like is used to represent giving an example, an illustration, or a description. Any embodiment or design described as an "example" or "for example" in embodiments of this application should not be explained as being more preferred or having more advantages than another embodiment or design. Exactly, use of the word "example", "for example", or the like is intended to present a related concept in a manner for ease of understanding.

The following describes related technologies in this application.

1. Timing Advance (TA)

In a mobile communication network, if a terminal device sends a system frame of uplink data after receiving a system frame that is of downlink data and that is sent by a base station, there is a time difference between a time point at which the system frame of the uplink data arrives at the base station and a time point at which the system frame of the uplink data is sent. In addition, because distances of different terminal devices from the base station are different, the different terminal devices have different time difference. Therefore, uplink information sent by the different terminal devices arrives at the base station at different moments, and interference is caused.

Using the TA, time points at which signals from the different terminal devices in a same subframe arrive at the base station are basically aligned, and may fall within a range of a cyclic prefix (CP), such that the base station can correctly receive uplink data sent by the different terminal devices.

In addition, when a value of the TA cannot be accurately determined, in other words, when uncertainty of the TA increases, a requirement for a physical random access channel (PRACH) sequence also increases correspondingly. For example, when the uncertainty of the TA increases, a cyclic prefix (CP) corresponding to a PRACH also increase accordingly, to increase system overheads and affect overall communication quality.

2. System Information (SI)

After a cell search process, a terminal device has implemented downlink synchronization with a network side, to obtain a physical cell identifier (PCI) of a cell. Then, the terminal device needs to obtain system information of the cell, to learn of how the cell is configured, in order to access the cell and operate normally in the cell.

Currently, the system information mainly includes a master information block (MIB) and a system information block (SIB). The cell sends system information to all terminal devices in the cell through a broadcast control channel (BCCH). The system information is mapped onto transport channels, namely, a broadcast channel (BCH) and a downlink shared channel (DL-SCH) through the BCCH. The BCH is only used to transmit MIB information and map the MIB information onto a physical broadcast channel (PBCH). The DL-SCH is used to transmit information about various SIBs and map the information about various SIBs onto a physical downlink shared channel (PDSCH). The MIB is used to transmit necessary information for accessing a network by the terminal device, and the SIBs are used to transmit system information other than the MIB.

In addition, the SIBs are classified into several types: an SIB 1, an SIB 2, . . . , and an SIB X. In a different protocol standard, a quantity X of types of the SIBs is different.

Currently, in a system information transmission design, there are the following three characteristics.

In a first aspect, all SIBs other than the SIB 1 are carried in a SI message of radio resource control (RRC), and a specific SIB included in one SI message is specified using si-SchedulingInfo in the SIB 1. In addition, each SIB can only be included in one SI message.

One or more SIBs having a same scheduling period other than the SIB 1 may be included in one SI message for transmission. For example, if the SIB 2 and an SIB 3 have a same scheduling period, the SIB 2 and the SIB 3 may be included in one SI message for transmission.

One SI message is transmitted in only one SI window (SI-window). For example, one SI message is associated with one SI window. In the SI window, only the SI message can be sent and may be repeatedly sent for a plurality of times (a specific quantity of times of sending the SI message and a specific slot in which the SI message is sent may be set based on a requirement), but another SI message cannot be sent. Two adjacent SI windows are next to each other and do not overlap or have a gap. SI windows of all SI messages have a same length. Periods of different SI messages are independent of each other. Each SI message includes at least one SIB, and SIBs having a same scheduling period may be transmitted in a same SI message.

In a second aspect, in a transmission process, the system information may be transmitted for a plurality of times in one modification period, but content of the system information does not change in a same modification period.

For example, it is assumed that a modification period of the system information is 0.64 seconds (s), and system information that needs to be transmitted includes the SIB 1, the SIB 2, and the SIB 3. In each modification period (0.64 s), the SIB 1, the SIB 2, and the SIB 3 may be sent for a plurality of times, but content of the SIB 1, the SIB 2, and the SIB 3 that are sent in one modification period does not change.

A start system frame of the modification period of the system information satisfies a formula: SFN mod m=0.

Herein, SFN is a system frame number, and m is a quantity of system frames that form one modification period. In other words, one modification period includes m system frames.

$$m=modificationPeriodCoeff*defaultPagingCycle$$

Herein, modificationPeriodCoeff is set based on SIB1→ServingCellConfigCommon→DownlinkConfigCommonSIB→BCCH-Config, and a value is usually 2, 4, 8, or 16; and defaultPagingCycle is configured based on SIB1→ServingCell ConfigCommon→DownlinkConfigCommon→DownlinkConfigCommonSIB→PCCH-Config→PagingCycle, and a value is rf32, rf64, rf128, or rf256 radio frames. Usually, the modification period is an integer multiple of a paging cycle.

In a third aspect, when the cell modifies some system information, the network side first sends a modification indication to the terminal device within one modification period, to notify the terminal device that the system information is to change. Then, the network side sends updated system information within a next modification period.

For example, as described in Section 5.2.1.3 of Protocol $3^{rd}$ Generation Partnership Project (3GPP) Technical Specification (TS) 36.331, in FIG. 1, the terminal device receives the modification indication in a modification period n, but in this case, the system information is still old system information, namely, system information 1 in the figure. In the following modification period n+1, the network side starts to broadcast new system information (namely, system information 2 in the figure). System information 3 does not change in the modification period n and the modification period n+1, and therefore remains unchanged.

For example, the network side sends the modification indication to the terminal device in two manners.

Manner 1: Whether the SI message changes are indicated using a short message of downlink control information (DCI) 10, and the short message is sent to UE through a physical downlink control channel (PDCCH) scrambled using a paging radio network temporary identifier (P-RNTI).

For example, the short message includes a field systemInfoModification (notifying a modification of the SIB 1/SIB 2/SIB 3/SIB 4/SIB 5) and a field etwsAndCmasIndication (notifying a modification of an SIB 6/SIB 7/SIB 8). If the short message received by the UE includes the field, it indicates that the system information will change in the next modification period.

Manner 2: Each SIB in the system information other than the SIB 1 corresponds to one field valueTag in the SIB 1, and a value corresponding to valueTag is increased by one each time the SIB changes.

For example, SI-SchedulingInfo→SchedulingInf→sibMappingInfo in the SIB 1 includes the field valueTag (a value range is 0 to 31), to indicate whether a SI message corresponding to the SIB changes. A user equipment (UE) may check, using the field, whether a previously stored SI message is still valid (for example, whether the UE goes back to a coverage area of the cell from an outside of coverage of the cell). If the field changes, the UE considers that the stored system information is invalid and needs to be read again; or if the field does not change, the stored system information is still valid. In addition, the UE considers that the stored system information is valid if valueTag does not change within three hours after a moment at which the SI message is received. In other words, a validity period of the stored SI message is 3 hours.

3. Non-Terrestrial Network (NTN)

A communication network that provides a communication service to a terminal device using a satellite or an aerial vehicle (airborne/vehicles) based on a terrestrial communication network is referred to as a non-terrestrial network. A device such as a satellite or an aerial vehicle deployed in the air in the NTN may be referred to as an NTN device. For example, the NTN device may be any of a satellite, a high altitude platform station (HAPS), or an air-to-ground (ATG) device. The NTN includes two transmission types: transparent transmission and non-transparent transmission (non-transparent transmission is also referred to as "regeneration transmission"). In a transparent transmission NTN, only a process such as frequency conversion or signal amplification is performed on a signal in the NTN device. In other words, the NTN device is a relay device between the terminal device and an access network device. In a non-transparent transmission NTN, the NTN device has some or all functions of the access network device.

The following describes technical solutions in embodiments of this application with reference to the accompanying drawings in embodiments of this application.

Figure 2:
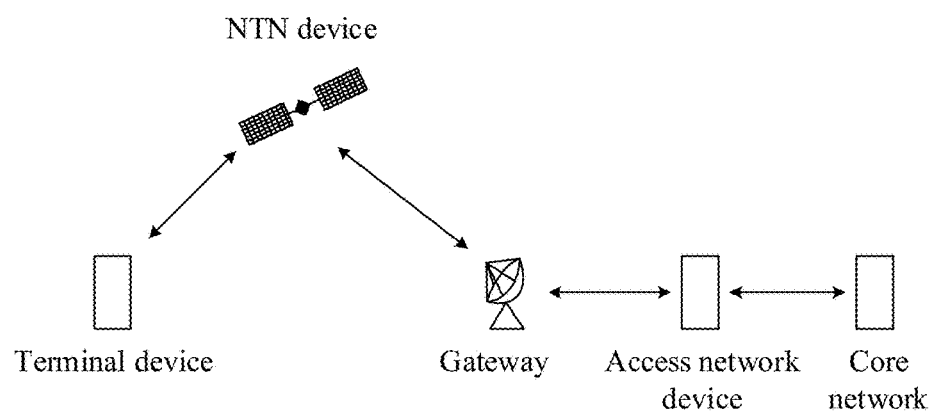
FIG. 2 is a diagram 1 of a system architecture of an NTN according to an embodiment of this application.

The technical solutions provided in embodiments of this application may be applied to an NTN, including a transparent transmission NTN or a non-transparent transmission NTN. For example, FIG. 2 is a schematic diagram of a system architecture of a transparent transmission NTN to which this application is applicable. A terminal device is wirelessly connected to an NTN device, and the NTN device is connected to an access network device through a terrestrial gateway. The access network device is connected to a core network.

Figure 3:
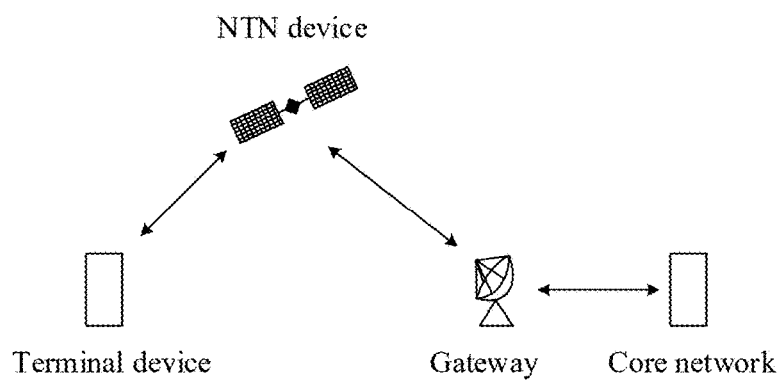
FIG. 3 is a diagram 2 of a system architecture of an NTN according to an embodiment of this application.

For another example, FIG. 3 is a schematic diagram of a system architecture of a non-transparent transmission NTN to which this application is applicable. A terminal device is wirelessly connected to an NTN device, and the NTN device may be connected to a core network through a terrestrial gateway.

In this embodiment of this application, the terminal device may be a device having a wireless transceiver function. The terminal device may be deployed on land, including an indoor or outdoor device, a hand-held device, or a vehicle-mounted device; may be deployed on a water surface (for example, on a ship); or may be deployed in air (for example, on an airplane, a balloon, and a satellite). The terminal device may be a UE. The UE includes a handheld device, a vehicle-mounted device, a wearable device, or a computing device that has a wireless communication function. For example, the UE may be a mobile phone, a tablet, or a computer having a wireless transceiver function. The terminal device may alternatively be a virtual reality (VR) terminal device, an augmented reality (AR) terminal device, a wireless terminal in industrial control, a wireless terminal in self driving, a wireless terminal in telemedicine, a wireless terminal in smart grid, a wireless terminal in smart city, a wireless terminal in smart home, or the like. In this embodiment of this application, the apparatus for implementing a function of the terminal device may be a terminal device, or may be an apparatus that can support the terminal device to implement the function, for example, a chip system. In this embodiment of this application, the chip system may include a chip, or may include a chip and another discrete component. In this embodiment of this application, the technical solutions provided in this embodiment of this application are described using an example in which the apparatus for implementing the function of the terminal device is a terminal device.

The NTN device may be any of a satellite, a high altitude platform station (HAPS), an air-to-ground (ATG) device, and the like.

The core network includes a plurality of core network elements (or referred to as network function network elements) such as an access and mobility function (AMF) network element, a session management function (SMF) network element, a policy control function (PCF) network element, a user plane function (UPF) network element, an application function (AF) network element, an authentication server function (AUSF) network element, and a unified data management (UDM) network element.

An access network device may include but is not limited to an access point (AP), for example, a home gateway, a router, a server, a switch, or a bridge, an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), a wireless relay node, a wireless backhaul node, a transmission point (TRP, or TP), or the like in a Wi-Fi system; or may be a gNB or a transmission point (TRP or TP) in a $5^{th}$ generation (5G) system, for example, a new radio (NR) system, one or a group of antenna panels (including a plurality of antenna panels) of a base station in the 5G system, or may be a network node constituting a gNB or a transmission point, for example, a baseband unit (BBU), a DU, or a roadside unit (RSU) having a function of the base station.

In this embodiment of this application, the access network device may be of a central until (CU)-distributed unit (DU) architecture. To be more specific, the access network device may include a CU and at least one DU. In this case, some functions of the access network device are deployed on the CU, and the other functions of the access network device are deployed on the DU. Functional division into the CU and DU is performed based on a protocol stack. In an implementation, a radio resource control (RRC) layer, a Packet Data Convergence Protocol (PDCP) layer, and a service data adaptation protocol (SDAP) layer in the protocol stack are deployed on the CU; a radio link control (RLC) layer, a media access control (MAC) layer, and a physical layer (PHY) in the protocol stack are deployed on the DU. Therefore, the CU has processing capabilities of RRC, PDCP, and SDAP. The DU has processing capabilities of RLC, MAC and PHY It can be understood that division into the functions is merely an example, and does not constitute a limitation on the CU and the DU. In other words, there may be another functional division manner between the CU and the DU. Details are not described herein in this embodiment of this application.

The following describes the technical solutions provided in embodiments of this application with reference to the application scenarios.

Currently, because a location of an NTN device dynamically changes in an NTN, a distance between a terminal device and the NTN device dynamically changes with the location of the NTN device, and a value of a timing advance of the terminal device also needs to dynamically change.

For example, in the NTN, the terminal device may calculate the TA in the following method.

S11: The terminal device obtains location coordinates Sat_pos of the NTN device and location coordinates UE_pos of the terminal device.

S12: The terminal device calculates, based on the location coordinates Sat_pos of the NTN device and the location coordinates UE_pos of the terminal device, a TA of sending uplink data by the terminal device.

In addition, during calculation of the TA, an offset of the TA usually needs to be further considered. Herein, offset may be used to reflect another parameter that affects the value of the TA and that is different from the location coordinates Sat_pos of the NTN device and the location coordinates UE_pos of the terminal device.

Figure 4:
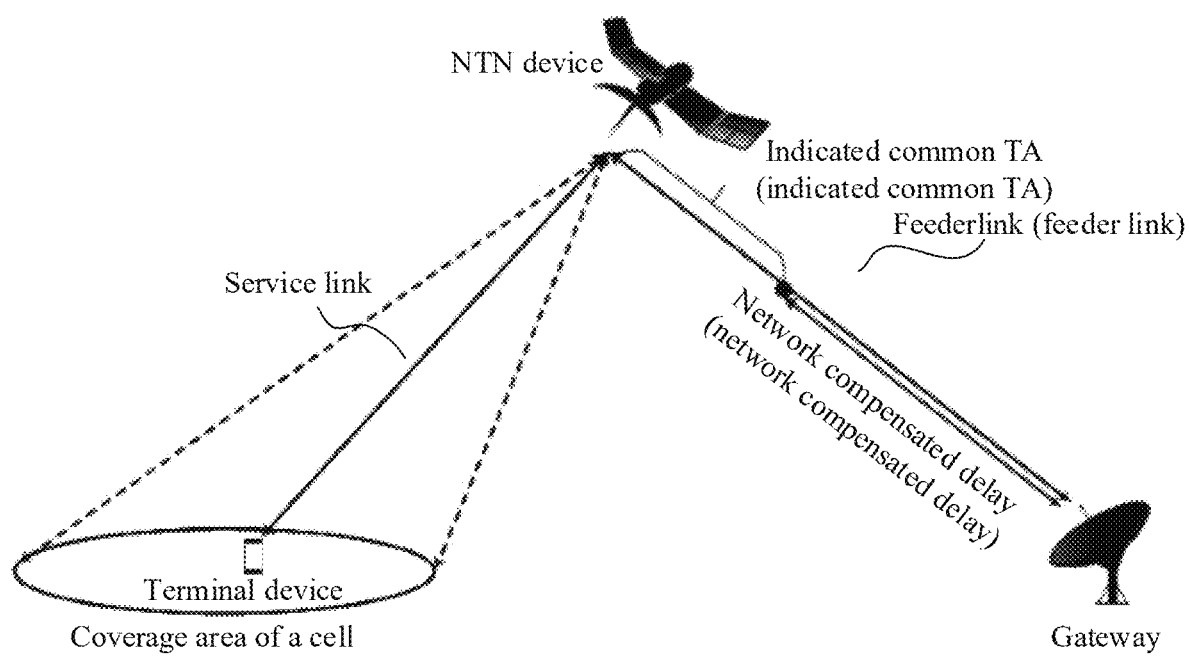
FIG. 4 is a diagram 3 of a system architecture of an NTN according to an embodiment of this application.

For example, offset may be used to reflect all or some transmission delays of a feederlink in a transparent transmission NTN. For example, as shown in FIG. 4, the feederlink includes an indicated common timing advance (indicated common TA) and a network compensated delay. Therefore, offset may be used to represent the indicated common TA, namely, a part of the transmission delay of the feederlink in the figure.

Figure 5:
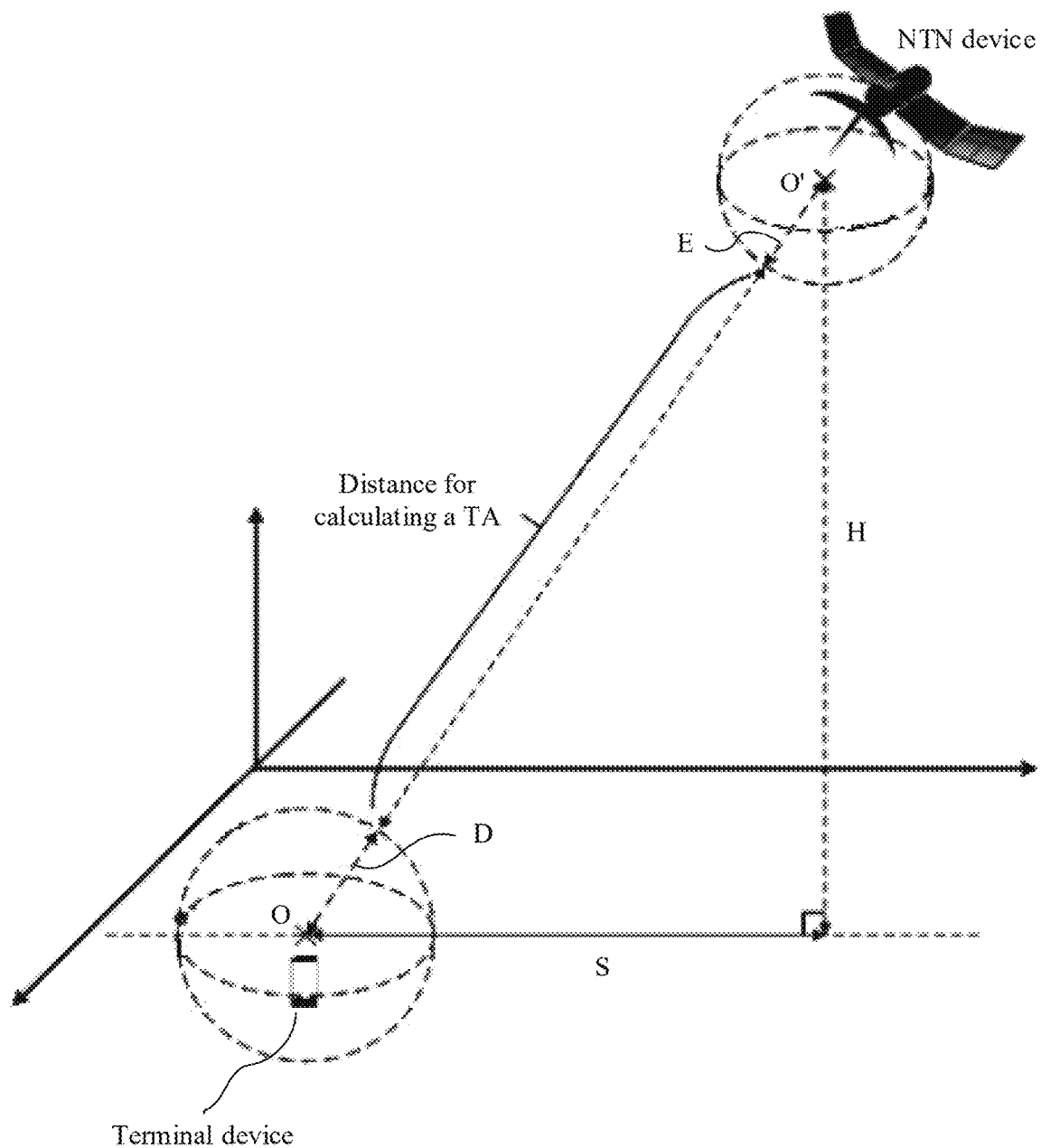
FIG. 5 is a diagram 4 of a system architecture of an NTN according to an embodiment of this application.

For another example, offset may be used to reflect a positioning error of the NTN device or the terminal device. For example, as shown in FIG. 5, O represents a location determined by the terminal device based on a positioning system (positioning based on Global Navigation Satellite System (GNSS)), O' represents a location determined by the NTN device based on an ephemeris (positioning based on ephemeris), H represents an obit altitude of the NTN device, S represents a distance of the terminal device to a sub-satellite point of the NTN device (distance from sub-satellite point), D represents a range of a positioning error of the terminal device, E represents a range of a positioning error of the NTN device, and a distance for calculating the TA may be |Sat_pos−UE_pos|. Further, offset may be a parameter for reflecting D and E in FIG. 5.

In addition, offset may be further used to reflect a parameter such as a timing advance offset $N_{TA\_offset}$ of a time-division duplex (TDD) system or a distance between the NTN device and a virtual coordinate location. In this application, it only needs to be ensured that offset can be used to determine a timing advance TA of the terminal device. Specific content reflected by offset may not be limited.

For example, the terminal device may calculate, based on Formula 1, a TA of sending a message MSG1 by the terminal device.

$$\text{TA for MSG1}=(\|Sat\_pos-UE\_pos\|+offset)\times 2/c \qquad \text{Formula 1}$$

Herein, |Sat_pos−UE_pos| represents the distance from the NTN device to the terminal device, Sat_pos represents the location of the NTN device, and Sat_pos may be actual location coordinates of the NTN device. In some scenarios, Sat_pos may alternatively be location coordinates of a virtual reference point. For example, an ATG or HAPS device in the NTN device may be unwilling to leak a location of the ATG or HAPS device. Therefore, a virtual coordinate location may be notified to the terminal device, and the distance from the NTN device to the terminal device may also be determined based on the virtual coordinate location. In addition, UE_pos represents a location of the terminal device.

It can be learned that, to calculate the TA of sending the uplink data by the terminal device, a location parameter that is of the NTN device and that exists when the terminal device sends the uplink data needs to be learned of.

In an implementation, the network device sends, to the terminal device, system information carrying the location parameter of the NTN device, such that the terminal device learns of the location of the NTN device.

However, in this implementation, the location parameter sent by the network device to the terminal device is only an instant value of a location at which the NTN device is located at a specific moment. In addition, because there is a modification period mechanism in the system information, the location parameter sent using the system information can be updated once every modification period. However, the terminal device needs to calculate the TA based on the location parameter that is of the NTN device and that exists when the uplink data is sent, and if the value of the TA is calculated based on the location parameter carried in the system information, uncertainty of the TA is increased, to affect communication quality.

For example, it is assumed that a modification period of the system information is 64 system frames. In a new radio access technology system, one system frame corresponds to 10 milliseconds (ms), and 64 system frames are 0.64 s. In other words, the network device can only statically notify the location parameter of the NTN device within 0.64 s. However, if the NTN device moves at a velocity of 7.5 km/s, the NTN device can move 4.8 km (to be more specific, 0.64 s×7.5 km/s) after 0.64 s, in other words, a maximum value of an error in the location of the NTN device may be 4.8 km. Due to the error, uncertainty of a TA of 4.8 km×2 is caused, a CP length of a PRACH is increased. The locations of the NTN device and the terminal device are not fully used to determine a more accurate TA.

In addition, because an updating period of the location parameter of the NTN device may be shorter than that of another type of system information, when the network device sends, to the terminal device, the system information carrying the location parameter of the NTN device, the system information may be frequently updated, and consequently, SI update is very frequently prompted.

To resolve the foregoing problem, in this application, it is considered that time information corresponding to the location parameter may be further notified to the terminal device when the network device sends the location parameter of the NTN device to the terminal device. Therefore, after receiving the location parameter of the NTN device, the terminal device may determine a time point corresponding to the location parameter based on the time information corresponding to the location parameter, and estimate, based on a difference between the time point corresponding to the location parameter and a time point at which the terminal device sends the uplink data, a location that is of the NTN device and that exists when the uplink data is sent, to determine a more accurate TA.

For example, the location parameter sent by the network device to the terminal device may include the location coordinates $\{x, y, z\}$ of the NTN device, a velocity $\{Vx, Vy, Vz\}$, acceleration $\{ax, ay, az\}$, a value d of the offset, a change rate $v_o$ of the offset, a derivative $a\_d$ of the change rate of the offset, and the like. In addition, the network device further notifies the terminal device of a time point t0 corresponding to the location parameter.

Then, after obtaining the location parameter and the time point t0, the terminal device may calculate, based on Formula 2 and Formula 3, the location coordinates Sat_pos of the NTN device and offset at a moment t at which the uplink data is sent.

$$\text{Sat\_pos}=\{x,y,z\}+\{vx,vy,vz\}\times(t-t0)+\{ax,ay,az\}\times(t-t0)^2 \quad \text{Formula 2}$$

$$\text{offset}=d+v_o\times(t-t0)+a_o\times(t-t0)^2 \quad \text{Formula 3}$$

Then, when the location coordinates Sat_pos of the NTN device and offset and the location coordinates UE_pos of the terminal device are known, the TA of sending MSG1 by the terminal device at the moment t can be calculated based on Formula 1.

It should be noted that a presentation manner of the offset may not be limited in this application. For example, in the foregoing, a distance is used as a dimension of the offset, and the TA is calculated in a calculation manner of Formula 1. When another dimension is used for the offset, the TA may be calculated in a corresponding calculation manner.

For example, in some scenarios, a corresponding distance may also be converted into a time point, and the time point may be further used as a dimension to describe the offset. For example, when the time point is used as the dimension of the offset, the TA of sending the message MSG1 by the terminal device may be calculated based on Formula 4.

$$\text{TA for MSG1}=\|\text{Sat\_pos}-\text{UE\_pos}\|\times 2/c+\text{offset} \quad \text{Formula 4}$$

The following describes the technical solutions provided in embodiments of this application with reference to the accompanying drawings.

Figure 6:
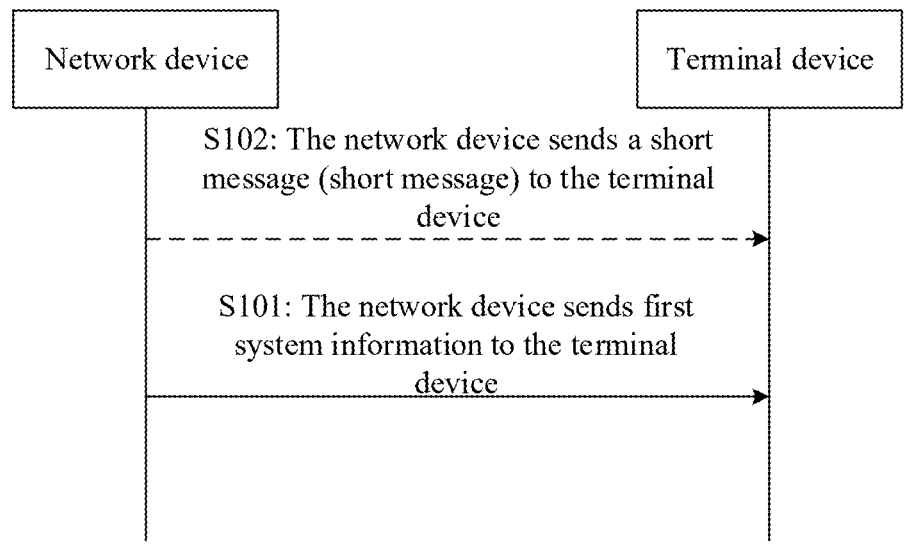
FIG. 6 is a schematic flowchart of a communication method according to an embodiment of this application.

An embodiment provides a communication method. The method may be applied to the communication system shown in FIG. 2 or FIG. 3. As shown in FIG. 6, the method includes the following steps.

S101: A network device sends first system information to a terminal device.

The first system information includes a location parameter of an NTN device, and the first system information is used to indicate time information of the location parameter.

For example, after the network device sends the first system information to the terminal device, the terminal device may first determine the location parameter of the NTN device by decoding the first system information, and further determine a location of the NTN device. In addition, because the first system information further indicates time information of the location parameter, the terminal device may further learn of a time point t0 corresponding to the location parameter. Therefore, the terminal device may obtain a location of the NTN device at a moment t through calculation, or the like, for example, may calculate the location of the NTN device at the moment t based on Formula 2. Further, the terminal device may calculate, based on information such as the location of the NTN device at the moment t and a location of the terminal device, a TA of sending uplink data by the terminal device at the moment t.

In addition, in this embodiment, the first system information for carrying the location parameter of the NTN device may include any of the following three implementations.

Implementation 1: The first system information may be an SIB 1.

In this implementation, because the location parameter of the NTN device is transmitted using an existing SIB 1, a type of an SIB does not need to be additionally added, to avoid adding an additional SIB-related description field and simplify description signaling overheads. In addition, because SIBs are sent sequentially starting from the SIB 1, the terminal device can obtain the location parameter of the NTN device earlier by transmitting the location parameter of the NTN device using the SIB 1.

Implementation 2: The first system information may be an SIB other than the SIB 1 defined in an existing protocol standard, for example, an SIB 2 or an SIB 3.

In this implementation, because the location parameter of the NTN device is transmitted using an existing SIB other than the SIB 1, a type of an SIB does not need to be additionally added, to avoid adding an additional SIB-related description field and simplify description signaling overheads. In addition, information about these SIBs may be shared between different cells under a same satellite.

Implementation 3: The first system information may be an SIB specially created to carry the location parameter of the NTN device.

In this implementation, an SIB is specially created to carry the location parameter of the NTN device, such that message classification can be clearer and a developer easily performs understanding and management in a development process. In addition, information about the SIB may be shared between different cells under a same satellite.

In addition, in this embodiment, the network device may be an access network device.

For example, in a communication system shown in FIG. 2, the NTN device is a relay device between the access network device and the terminal device. In addition, the access network device may send the first system information to the terminal device using the NTN device.

In addition, the network device may be an NTN device.

For example, in the communication system shown in FIG. 2, the NTN device may send the first system information to the terminal device after receiving the first system information from the access network device. For another example, in a communication system shown in FIG. 3, the NTN device has some or all functions of the access network device. In this case, the NTN device may send the first system information to the terminal device.

The location parameter of the NTN device may include various parameters for indicating a location of the NTN device.

In a possible design, the location parameter of the NTN device may include the location of the NTN device.

Two implementations representing the location of the NTN device are provided in this application.

In Implementation 1, the location of the NTN device may be represented based on location coordinates of the NTN device in an Earth-centered, Earth-fixed coordinate system (ECEF). In other words, the location parameter of the NTN device may include an ECEF-based location of the NTN device.

Implementation 2: The location of the NTN device may be represented based on longitude and latitude of the NTN device and a height of the NTN device. In other words, the location parameter of the NTN device may include the longitude and the latitude of the NTN device and the height of the NTN device.

In an implementation, the first system information further includes second indication information. The second indication information is used to indicate that the location parameter of the NTN device includes the ECEF-based location of the NTN device; or the second indication information is used to indicate that the location parameter of the NTN device includes the longitude and the latitude of the NTN device and the height of the NTN device.

In the foregoing implementations, an implementation is easy in consideration that in a representation method provided in Implementation 1, an ECEF-based location representation method is widely applied, and many references are given to product development. In a representation method provided in Implementation 2, the height of the NTN device may be represented based on an altitude. Herein, because an earth radius (6371 km) accounts for a majority of a height value of the NTN device (for example, a LEO satellite), for example, 6971 km, the height of the NTN device is represented based on the altitude, to significantly reduce bit overheads existing during information transmission. Therefore, the second indication information is added to the first system information, to select, for sending, the ECEF-based location of the NTN device or the longitude and the latitude of the NTN device and the height of the NTN device from the location parameter that is of the NTN device and that is sent by the network device to the terminal device. Then, after receiving the first system information, the terminal device may determine, based on the second indication information, whether the first system information carries the ECEF-based location of the NTN device, the longitude and the latitude of the NTN device, or the height of the NTN device, such that the terminal device performs parsing.

Further, in an implementation, the location parameter of the NTN device may include the location of the NTN device and motion information of the NTN device. The motion information of the NTN device is used to represent a motion state of the NTN device, and may include one or more of information such as a velocity, acceleration, and a derivative of the acceleration of the NTN device.

In the design, after the network device sends the first system information to the terminal device, the terminal device may determine the location of the NTN device, the motion information of the NTN device, and a moment t0 corresponding to the location parameter. Then, the terminal device may determine a location of the NTN device at another moment other than t0 based on the location of the NTN device and the motion information of the NTN device.

In a possible design, the first system information further includes an offset of the TA of the terminal device.

In the design, after receiving the system information, the terminal device may obtain the offset of the TA of the terminal device, such that the terminal device determines, based on the offset, the TA of sending the uplink data.

Further, in an implementation, the first system information further includes change information of the offset of the TA of the terminal device.

For example, the change information of the offset may include a change rate of the offset, a derivative of the change rate of offset, and the like.

In a possible design, it is considered that in different NTN systems, different parameters are used when the terminal device determines the TA. For example, parameters used when the terminal device determines the TA in six different NTN systems are shown in Table 1.

TABLE 1

| | Location of an NTN device | Motion information of the NTN device | Offset of a TA of a terminal device | Change information of an offset |
|---|---|---|---|---|
| LEO transparent transmission | Required | Required | Optional | Optional |
| LEO regeneration | Required | Required | Optional | Not required |
| GEO transparent transmission | Required | Not required | Optional | Not required |

TABLE 1-continued

| | Location of an NTN device | Motion information of the NTN device | Offset of a TA of a terminal device | Change information of an offset |
|---|---|---|---|---|
| HAPS transparent transmission | Required | Optional | Optional | Optional |
| HAPS regeneration | Required | Optional | Optional | Not required |
| ATG | Optional (at least one of the location of the NTN device or the offset of the TA of the terminal device exists) | Not required | Optional (at least one of the offset of the TA of the terminal device or the location of the NTN device exists) | Not required |

Herein, "LEO transparent transmission" represents a low-earth orbit (LEO) satellite-based transparent transmission NTN system, "LEO regeneration" represents a LEO satellite-based regeneration NTN system, "GEO transparent transmission" represents a geostationary earth orbit satellite-based transparent transmission NTN system, "HAPS transparent transmission" represents an HAPS device-based transparent transmission NTN system, "HAPS regeneration" represents a HAPS device-based regeneration NTN system, and "ATG" represents an ATG device-based NTN system.

It can be learned from Table 1 that in different NTN systems, different parameters are used when the terminal device determines the TA.

Therefore, in the method provided in this embodiment, a frame structure of a predetermined format may be used to carry the first system information. The frame structure includes four fields: a first field, a second field, a third field, and a fourth field. The four fields are respectively used to carry the location of the NTN device, the motion information of the NTN device, the offset of the TA of the terminal device, and the change information of the offset.

For example, in some scenarios, if one or more of the location of the NTN device, the motion information of the NTN device, the offset of the TA of the terminal device, and the change information of the offset are not required, a corresponding field may be directly set to zero (or set to another value), such that after reading the field, the terminal device can learn that the system information does not include a corresponding parameter for transmitting the field; or a corresponding field may be directly not transmitted, to reduce signaling overheads.

For example, if the location of the NTN device is not required, a field corresponding to the location of the NTN device may be set to a preset value that is impossible to use, for example, zero; or the variable is not transmitted. Then, a transmission delay from a platform to ULE is not considered when a correlation value of the TA is calculated. In this case, the terminal device may directly calculate a TA of sending MSG1 based on Formula 5.

$$TA \text{ for } MSG1 = \text{offset} \times 2/c \qquad \text{Formula 5}$$

In addition, it is considered that in the NTN, the location parameter of the NTN device is usually used only when the terminal device accesses a network or performs mobility management; in addition, an updating period of the location parameter of the NTN device is shorter than an updating period of other system information. Therefore, if the location parameter of the NTN device is sent based on the system information, a modification frequency of the system information is greatly increased. In addition, it can be learned from the foregoing related technology description that each time content of the system information changes, a network side sends a modification indication to the terminal device (including sending the modification indication to the terminal device based on a short message or a field valueTag in an SIB 1), to prompt the terminal device to update the system information. Therefore, after the modification frequency of the system information increases, a frequency of updating the system information by the terminal device increases.

For example, it is assumed that the updating period of the location parameter of the NTN device is 0.5 s, the updating period of the other system information is 10 s, and a modification period of the system information is 0.64 s. Then, it can be learned that, when the location parameter of the NTN device is not sent based on the system information, the content of the system information is usually modified once every 15 or 16 modification periods (10 s/0.64 s=15.625). When the location parameter of the NTN device is sent based on the system information, because the updating period of the location parameter of the NTN device is less than the modification period of the system information (0.5 s<0.64 s), the content of the system information is modified once every modification period. Further, the terminal device needs to update the system information every modification period. When the terminal device does not access a network or perform mobility management, the location parameter that is of the NTN device and that is updated by the terminal device is usually useless.

Therefore, in a possible design, the method provided in this embodiment further includes the following.

S102: The network device sends a short message to the terminal device.

An updating label of the first system information in the short message remains unchanged when the location parameter of the NTN device changes. In other words, the updating label of the first system information in the short message does not change with the location parameter of the NTN device.

For example, when the first system information is any one of an SIB 1, an SIB 2, an SIB 3, an SIB 4, or an SIB 5, the updating label of the first system information in short message may be a field systemInfoModification in the short message. Further, when the location parameter of the NTN device changes, the field systemInfoModification does not change accordingly. For another example, when the first system information is any one of an SIB 6, an SIB 7, or an SIB 8, the updating label of the first system information in the short message may be a field etwsAndCmasIndication.

Further, when the location parameter of the NTN device changes, the field etwsAndCmasIndication does not change accordingly.

In the design, the updating label of the first system information in the short message remains unchanged when the location parameter of the NTN device changes. Therefore, the terminal device is not notified that an SIB corresponding to the first system information changes, and therefore, does not need to read the SIB.

It should be noted that, in an example implementation process, as shown in FIG. 6, S102 may be performed before S101. In other words, the network device first sends the short message to the terminal device, such that the terminal device determines whether content of each SIB changes. Then, the network device sends the first system information to the terminal device, such that the terminal device obtains the first system information. In addition, S102 may be performed after S101. In other words, the network device first sends the first system information to the terminal device, and then the network device sends the short message to the terminal device. After decoding the short message, the terminal device may determine, based on the updating label in the short message, whether to decode content of the first system information.

In another possible design, in this embodiment, a field valueTag corresponding to the first system information remains unchanged when the location parameter of the NTN device changes.

The field valueTag corresponding to the first system information is used to indicate whether content of the SIB corresponding to the first system information changes. When the content of the SIB corresponding to the first system information does not change, the field valueTag corresponding to the first system information remains unchanged.

For example, it is learned from the description of the related technology that each SIB other than the SIB 1 corresponds to one field valueTag in the SIB 1. It is assumed that the first system information is the SIB 2, when the location parameter of the NTN device changes, the location parameter that is of the NTN device and that is carried in the SIB 2 changes accordingly. In addition, a field valueTag corresponding to the SIB 2 in the SIB 1 does not change. Therefore, the terminal device is not notified that the SIB corresponding to the first system information changes, and therefore, does not need to read the SIB.

In addition, in a possible design, in this embodiment, a predetermined time point in a modification period of the first system information is used to indicate time information of the location parameter of the NTN device.

In the design, it is considered that the predetermined time point in the modification period of the first system information may be used as a timestamp of the location parameter of the NTN device in the first system information. Further, each time the network device sends the first system information to the terminal device, the first system information may include a location parameter of the NTN device at the predetermined time point in the modification period. Then, after receiving the first system information, the terminal device may obtain the predetermined time point based on an agreement, and further obtain the time information of the location parameter of the NTN device.

For example, it is assumed that the modification period of the first system information is m system frames. Then, an end time point t of an nth system frame of the modification period of the first system information is set as the predetermined time point. Further, the method provided in this embodiment may include the following steps.

S201: A network device sends first system information to a terminal device. The first system information includes a location parameter of an NTN device at the end time point t0.

S202: After performing downlink synchronization, the terminal device may learn of an SFN of sending a signal by the network device, and may learn of parameter configurations modificationPeriodCoeff and defaultPagingCycle in an SIB 1 based on an agreed rule after the SIB 1 is resolved.

S203: The terminal device may learn of a value of m based on the parameter configurations modificationPeriodCoeff and defaultPagingCycle. In addition, the terminal device may find a start point and an end point of a modification period based on SFN mod m=0.

S204: The terminal device determines a location of an nth system frame of the modification period, and determines an end time point t0.

S205: The terminal device obtains a location parameter of the NTN device at the end time point t0 based on the first system information from the network device.

S206: The terminal device calculates, based on the end time point t0, the location parameter of the NTN device, and an offset-related parameter, a distance between the NTN device and the terminal device at a moment t at which uplink data is sent, and further determines a TA at the moment t.

In addition, in an implementation, when the time information of the location parameter of the NTN device is indicated using the predetermined time point in the modification period of the first system information, the predetermined time point may be a start time point of the modification period of the system information.

In this implementation, the start time point of the modification period of the system information is used as a predetermined time point t0, to ensure that the moment t at which the uplink data is sent is always greater than the predetermined time point t0, that is, t−t0 is always a positive number, and reduce symbol overheads for storage.

In another implementation, when the time information of the location parameter of the NTN device is indicated using the predetermined time point in the modification period of the first system information, the predetermined time point may be an end time point of the modification period of the first system information.

It is considered that, in a process of receiving the first system information from the network device, the terminal device needs to decode the first system information, to obtain the location parameter of the NTN device. If the predetermined time point is obtained before decoding is completed, time information of the predetermined time point needs to be buffered first, and a subsequent step can be performed only after the first system information is decoded (for example, the TA is calculated based on information such as the location parameter of the NTN device and the predetermined time point). Therefore, in the implementation, the end time point of the modification period of the system information is used as the predetermined time point t0, such that the terminal device can first receive the first system information and then determine the end time point of the modification period of the first system information. Therefore, the terminal device can decode the first system information using a time difference between a time point of receiving the first system information and a time point of determining the end time point, to improve a TA calculation speed.

In still another implementation, when the time information of the location parameter of the NTN device is indicated using the predetermined time point in the modification period of the first system information, the predetermined time point may be a central time point of the modification period of the system information.

In this implementation, the central time point of the modification period of the system information is used as the predetermined time point to, such that a modulus (namely, |t−t0|) of a difference between the moment t at which the uplink data is sent and the predetermined time point t0 is kept in a small range, to reduce a fitting error.

In addition, in the design, the predetermined time point may be a time point other than the start time point, the end time point, and the central time point in the modification period of the system information, and a location of the predetermined time point in the modification period may not be limited in this application.

In another possible design, in this embodiment, a predetermined time point of a SI window carrying the first system information is used to indicate the time information of the location parameter.

In the design, it is considered that the predetermined time point of the SI window carrying the first system information may be used as a timestamp of the location parameter of the NTN device in the first system information. Further, each time the network device sends the first system information to the terminal device, the first system information may include the location parameter of the NTN device at the predetermined time point. Then, after receiving the first system information, the terminal device may obtain the predetermined time point based on the agreement, and further obtain the time information of the location parameter of the NTN device.

For example, it is assumed that the first system information is an SIB 2, a SI window carrying the SIB 2 may be determined as a SI window carrying a SI message in which the SIB 2 is located. Further, the method provided in this embodiment may include the following steps.

S301: A network device sends first system information to a terminal device. The first system information includes a location parameter of an NTN device at a preset time point t0 of a SI window carrying an SIB 2.

In an implementation, the preset time point of the SI window carrying the SIB 2 may be any time point of the SI window carrying the SIB 2, for example, a start time point, an end time point, or any time point between the start time point and the end time point of the SI window carrying the SIB 2.

In another implementation, the preset time point of the SI window carrying the SIB 2 may be a boundary moment of a nearest system frame after the SI window carrying the SIB 2 ends. In other words, in this implementation, the preset time point of the SI window carrying the first system information may be a boundary moment of a nearest system frame after a SI window carrying the first system information ends.

S302: After performing downlink synchronization, the terminal device may learn of an SFN of sending a signal by the network device, and may learn of parameter configurations modificationPeriodCoeff and defaultPagingCycle in an SIB 1 based on an agreed rule after the SIB 1 is resolved.

S303: The terminal device may learn of a value of a quantity m of system frames of a modification period based on the parameter configurations modificationPeriodCoeff and defaultPagingCycle.

S304: The terminal device determines an SFN corresponding to the SI window carrying the SIB 2 in the modification period and a preset time point t0 of the SI window carrying the SIB 2.

S305: The terminal device obtains a location parameter of the NTN device at an end time point t0 based on the SIB 2 from the network device.

S306: The terminal device calculates, based on the end time point to, the location parameter of the NTN device, and an offset-related parameter, a distance between the NTN device and the terminal device at a moment t at which uplink data is sent, and further determines a TA at the moment t.

In still another possible design, the method provided in this embodiment may further include:

S103: The network device sends first indication information to the terminal device.

The first indication information is used to indicate a reference time unit. Time information of the reference time unit is time information of the location parameter of the NTN device. The reference time unit may be a system frame or a slot.

For example, the first indication information may indicate one predetermined system frame. The time information of the system frame is used as the time information of the location parameter of the NTN device. For example, a time point corresponding to an end boundary of the system frame is used as a time point corresponding to the location parameter of the NTN device.

For another example, the first indication information may indicate one predetermined slot. Time information of the slot is used as the time information of the location parameter of the NTN device. For example, a time point corresponding to an end boundary of the slot is used as a time point corresponding to the location parameter of the NTN device.

The reference time unit indicated by the first indication information may be a reference time unit that has been transmitted, or may be a reference time unit that is not transmitted and is to be transmitted. This is not limited in this application.

For example, the reference time unit is used as a system frame. The method provided in this embodiment may include the following steps.

S401: A network device sends first system information to a terminal device. The first system information includes a location parameter of an NTN device at the end time point t0.

S402: The network device sends first indication information to the terminal device.

The first indication information may include an SFN of a system frame that is used as a reference time unit.

S403: The terminal device determines a location parameter of the NTN device based on the first system information.

S404: The terminal device determines, based on the SFN of the system frame that is used as the reference time unit, the system frame that is used as the reference time unit, and determines time information of the system frame. A time point t0 corresponding to the location parameter of the NTN device is further determined.

For example, after determining the system frame that is used as the reference time unit, the terminal device obtains a time point (namely, time information of the system frame) at a predetermined location of the system frame based on a predetermined rule, for example, obtains a start time point, an end time point, or the like of the system frame, and then uses the time point as the time point t0 corresponding to the location parameter of the NTN device. The predetermined rule may be a rule preconfigured by the network device to the terminal device, or the predetermined rule may be obtained by the terminal device in another manner. Content of the predetermined rule and an obtaining manner may not be limited in this application.

S405: The terminal device calculates, based on the time point to, the location parameter of the NTN device, and an offset-related parameter, a distance between the NTN device and the terminal device at a moment t at which uplink data is sent, and further determines a TA at the moment t.

In the design, the network device sends the first indication information to the terminal device, such that the terminal device can determine a time point that is of the location parameter of the NTN device and that is included in the first system information. In addition, it is considered that the network device may send the system information to the terminal device in two manners: a broadcast manner and an on-demand manner. In the on-demand manner, the network device sends the system information to the terminal device based on a request of the terminal device. Because a time point of sending the request is not regular, in consideration that a time period of resource preparation for downlink scheduling is uncertain, in the on-demand manner, it is not easy to indicate the time point of the location parameter of the NTN device using a system time number. When the design is applied to a scenario in which transmission is performed in the on-demand manner, an indication of binding of the time information of the location parameter of the NTN device and the system time number may be avoided, such that an implementation is more flexible.

In an implementation, when the system information between the network device and the terminal device includes an SIB 9, the first indication information may be time information of the SIB 9. Therefore, a time point of the location parameter that is of the NTN device and that is included in the first system information can be determined from the time information of the SIB 9.

For example, when the first system information is transmitted in the on-demand manner, and the terminal device requests the network device to send the first system information, the network device schedules the SIB 9 and the first system information to the terminal device together, such that the terminal device determines the time point of the location parameter that is of the NTN device and that is included in the first system information.

It may be understood that, in embodiments of this application, a terminal device and/or a network device may perform some or all steps in embodiments of this application. These steps or operations are merely examples. In embodiments of this application, another operation or variations of various operations may also be performed. In addition, the steps may be performed in a different sequence presented in embodiments of this application, and it is possible that not all operations in embodiments of this application are to be performed. Embodiments provided in this application may be associated with each other and may be mutually referenced or cited.

The solutions provided in embodiments of this application are mainly described in the foregoing embodiments from a perspective of interaction between devices. It should be understood that, to achieve a corresponding function, the terminal device, a master node, or a slave node includes a corresponding hardware structure and/or software module corresponding to each function. A person skilled in the art should easily be aware that, in combination with the examples described in embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, a device (the terminal device, the master node, or the slave node) may be divided into functional modules based on the foregoing method examples. For example, each functional module may be obtained through division for a corresponding function, or two or more functions may be integrated into one processing module. The integrated module may be implemented in a form of hardware, or may be implemented in a form of a software functional module. In this embodiment of this application, module division is an example, and is merely a logical function division. In actual implementation, another division manner may be used.

Figure 7:
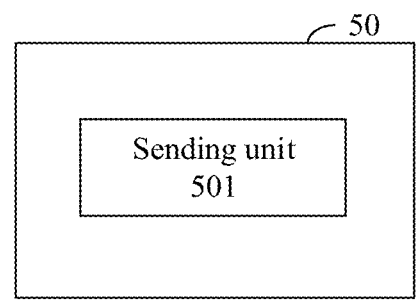
FIG. 7 is a schematic diagram 1 of a structure of a communication apparatus according to an embodiment of this application.

FIG. 7 is a schematic diagram of composition of a communication apparatus 50 according to an embodiment of this application. The communication apparatus 50 may be a chip or a system on chip in a network device. The communication apparatus 50 may be configured to perform a function of the network device in the foregoing embodiments. In an implementation, the communication apparatus 50 includes: a sending unit 501, configured to send system information to a terminal device, where the system information includes a location parameter of a NTN device, and the system information is used to indicate time information of the location parameter.

In a possible design, a predetermined time point in a modification period of the system information is used to indicate the time information of the location parameter.

In a possible design, the predetermined time point is a start time point or an end time point of the modification period of the system information, or any time point other than the start time point and the end time point.

In a possible design, a predetermined time point of a SI window carrying the system information is used to indicate the time information of the location parameter.

In a possible design, the predetermined time point is a boundary moment of a nearest system frame after the SI window carrying the system information ends.

In a possible design, the system information further includes time information of an end location of a SI window carrying a predetermined system information block (SIB); and the time information of the end location of the SI window carrying the predetermined SIB is the time information of the location parameter.

In a possible design, the sending unit 501 is further configured to send first indication information to the terminal device. The first indication information is used to indicate a reference time unit, time information of the reference time unit is the time information of the location parameter, and the reference time unit is a system frame or a slot.

In a possible design, the sending unit 501 is further configured to send a short message to the terminal device. An updating label of the system information in the short message remains unchanged when the location parameter of the NTN device changes.

In a possible design, a field valueTag corresponding to the system information remains unchanged when the location parameter of the NTN device changes.

In a possible design, the location parameter of the NTN device includes a location of the NTN device; or the location parameter of the NTN device includes a location of the NTN device and motion information of the NTN device.

In a possible design, the location parameter of the NTN device includes an ECEF-based location parameter of the NTN device.

In a possible design, the location parameter of the NTN device includes longitude and latitude of the NTN device and a height of the NTN device.

In a possible design, the system information further includes an offset of a timing advance TA of the terminal device and change information of the offset.

In a possible design, the communication apparatus 50 is built into the NTN device; or the communication apparatus 50 is built into an access network device, and the NTN device is a relay device between the access network device and the terminal device.

Figure 8:
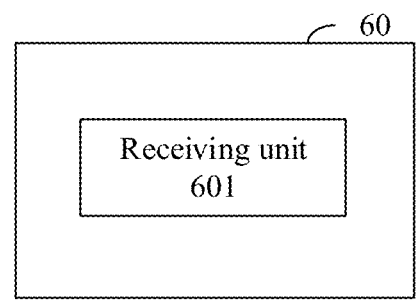
FIG. 8 is a schematic diagram 2 of a structure of a communication apparatus according to an embodiment of this application.

FIG. 8 is a schematic diagram of composition of another communication apparatus 60 according to an embodiment of this application. The communication apparatus 60 may be a chip or a system on chip in a terminal device. The communication apparatus 60 may be configured to perform a function of the terminal device in the foregoing embodiments. In an implementation, the communication apparatus 60 includes: a receiving unit 601, configured to receive system information (SI) from a network device, where the system information includes a location parameter of a NTN device, and the system information is used to indicate time information of the location parameter.

In a possible design, a predetermined time point in a modification period of the system information is used to indicate the time information of the location parameter.

In a possible design, the predetermined time point is a start time point or an end time point of the modification period of the system information, or any time point other than the start time point and the end time point.

In a possible design, a predetermined time point of a SI window carrying the system information is used to indicate the time information of the location parameter.

In a possible design, the predetermined time point is a boundary moment of a nearest system frame after a SI window carrying the location parameter of the system information ends.

In a possible design, the receiving unit 601 is further configured to receive first indication information from the network device. The first indication information is used to indicate a reference time unit, time information of the reference time unit is the time information of the location parameter, and the reference time unit is a system frame or a slot.

In a possible design, the receiving unit 601 is further configured to receive a short message from the network device. An updating label of the system information in the short message remains unchanged when the location parameter of the NTN device changes.

In a possible design, a field valueTag corresponding to the system information remains unchanged when the location parameter of the NTN device changes.

In a possible design, the location parameter of the NTN device includes a location of the NTN device; or the location parameter of the NTN device includes a location of the NTN device and motion information of the NTN device.

In a possible design, the location parameter of the NTN device includes an ECEF coordinate system (e.g., an ECEF-based location parameter) of the NTN device.

In a possible design, the location parameter of the NTN device includes longitude and latitude of the NTN device and a height of the NTN device.

In a possible design, the system information further includes an offset of a timing advance TA of the terminal device and change information of the offset.

In a possible design, the network device is the NTN device; or the network device is an access network device, and the NTN device is a relay device between the access network device and the terminal device.

Figure 9:
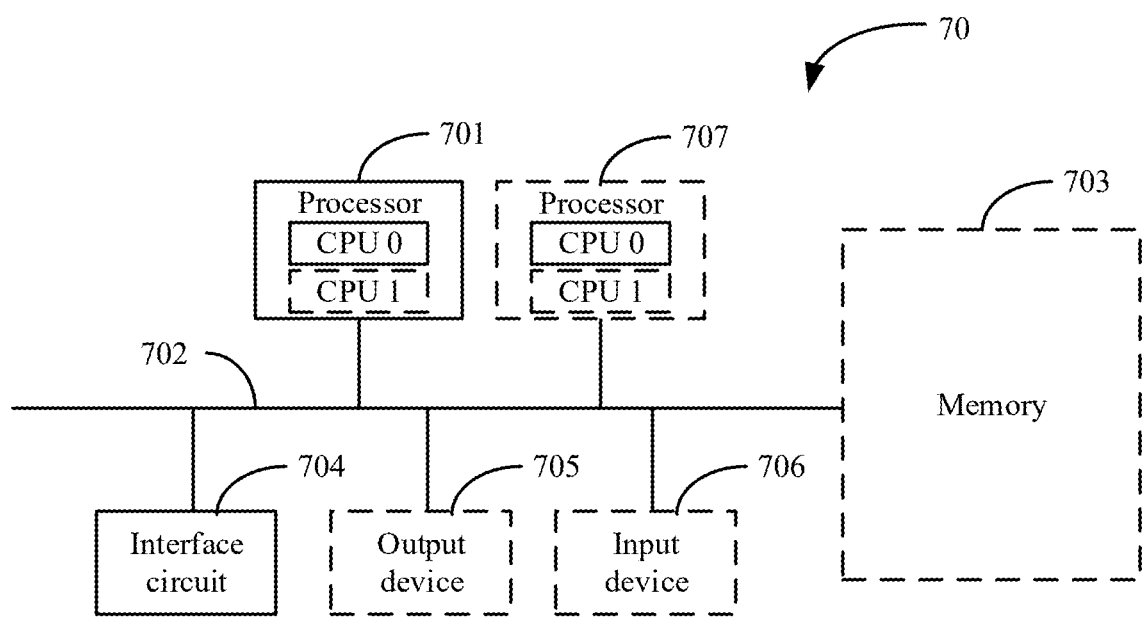
FIG. 9 is a schematic diagram 3 of a structure of a communication apparatus according to an embodiment of this application.

FIG. 9 is a schematic diagram of composition of a communication apparatus 70. The communication apparatus 70 includes at least one processor 701 and at least one interface circuit 704. In addition, the communication apparatus 70 may further include a communication line 702 and a memory 703.

The processor 701 may be a general-purpose central processing unit (CPU), a microprocessor, an application-specific integrated circuit (ASIC), or one or more integrated circuits configured to control program execution of the solutions in this application.

The communication line 702 may include a path, to transfer information between the foregoing components.

The interface circuit 704 is any apparatus of a transceiver type, and is configured to communicate with another device or a communication network, for example, the Ethernet, a radio access network (RAN), or a wireless local area network (WLAN).

For example, the memory 703 may be a read-only memory (ROM) or another type of static storage device that can store static information and instructions, or a random-access memory (RAM) or another type of dynamic storage device that can store information and instructions, or may be an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory 703 is not limited thereto. The memory 703 may exist independently, and is connected to the processor 701 through the communication line 702. Alternatively, the memory 703 may be integrated with the processor 701.

The memory 703 is configured to store computer-executable instructions for performing the solutions in this application, and the processor 701 controls execution. The processor 701 is configured to store the computer-executable instructions stored in the memory 703, to implement the method provided in the foregoing embodiments of this application.

For example, in some embodiments, when the processor 701 executes the instructions stored in the memory 703, the communication apparatus 70 is enabled to perform operations of sending a short message to a terminal device and sending system information to the terminal device in S101 and S102 in FIG. 6 and another operation that needs to be performed by the network device.

In another embodiment, when the processor 701 executes the instructions stored in the memory 703, the communication apparatus 70 is enabled to perform operations of receiving the short message from the network device and receiving the system information from the network device in S101 and S102 in FIG. 6 and another operation that needs to be performed by the terminal device.

Optionally, computer-executable instructions in this embodiment of this application may also be referred to as application program code. This is not specifically limited in this embodiment of this application.

During implementation, in an embodiment, the processor 701 may include one or more CPUs such as a CPU 0 and a CPU 1 in FIG. 9.

In an example implementation, in an embodiment, the communication apparatus 70 may include a plurality of processors such as processor 701 and a processor 707 in FIG. 9. Each of the processors may be a single-core (single-CPU) processor or a multi-core (multi-CPU) processor. The processor herein may refer to one or more devices, circuits, and/or processing cores configured to process data (for example, computer program instructions).

In an example implementation, in an embodiment, the communication apparatus 70 may further include an output device 705 and an input device 706. The output device 705 communicates with the processor 701, and may display information in a plurality of manners. For example, the output device 705 may be a liquid-crystal display (LCD), a light-emitting diode (LED) display device, a cathode-ray tube (CRT) display device, or a projector. The input device 706 communicates with the processor 701, and may receive user input in a plurality of manners. For example, the input device 706 may be a mouse, a keyboard, a touchscreen device, or a sensor device.

An embodiment of this application provides a computer-readable storage medium. The computer-readable storage medium stores instructions. When the instructions run, the method provided in embodiments of this application is performed.

An embodiment of this application further provides a computer program product including instructions. When the computer program product runs on a computer, the computer is enabled to perform the method provided in embodiments.

In addition, an embodiment of this application further provides a chip. The chip includes a processor. When the processor executes computer program instructions, the chip is enabled to perform the method provided in embodiments of this application. The instruction may be from a memory inside the chip or from a memory outside the chip. Optionally, the chip further includes an input/output circuit that is used as a communication interface.

All or some of functions, actions, operations, steps, or the like in embodiments may be implemented using software, hardware, firmware, or a combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk such as a solid-state drive (SSD)), or the like.

Although this application is described with reference to example features and all the embodiments thereof, it is clear that various modifications and combinations may be made to them without departing from the spirit and scope of this application. Correspondingly, this specification and the accompanying drawings are merely example description of this application defined by the appended claims, and are considered as any or all of modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method, comprising:
receiving, by a terminal device, system information (SI) from a network device,
wherein the SI comprises a location parameter of a non-terrestrial network (NTN) device, wherein at least one of a field valueTag corresponding to the SI or an updating label of the SI remains unchanged when the location parameter changes, wherein the updating label is in a short message from the network device, wherein the SI indicates time information of the location parameter, and wherein: the SI includes the time information of the location parameter; or a predetermined time point of a SI window carrying the SI indicates the time information of the location parameter.

2. The communication method according to claim 1, wherein the predetermined time point is a boundary moment of a nearest system frame after a SI window carrying the location parameter of the SI ends.

3. The communication method according to claim 1, further comprising receiving, by the terminal device, first indication information from the network device, wherein the first indication information indicates a reference time unit, wherein reference time information of the reference time unit is the time information of the location parameter, and wherein the reference time unit is a system frame or a slot.

4. The communication method according to claim 1, wherein the location parameter of the NTN device comprises: a location of the NTN device; or the location of the NTN device and motion information of the NTN device.

5. The communication method according to claim 1, wherein the location parameter of the NTN device comprises an Earth-centered, Earth-fixed coordinate system ECEF-based location parameter of the NTN device.

6. The method according to claim 1, wherein the system information further comprises a common timing advance (TA) and change information of the common TA.

7. The method according to claim 6, wherein the change information of the common TA comprises at least one of a change rate of the common TA or a derivative of the change rate of the common TA.

8. The method according to claim 6, wherein the common TA, change information of the common TA, the location parameter of the NTN device, and the time information of the location parameter are used for determining a timing advance of uplink data transmission.

9. A communication apparatus, comprising:
at least one memory storing computer program; and
a processor coupled to the at least one memory and configured to execute the computer program to cause the communication apparatus to:
- receive, system information (SI) from a network device,
- wherein the SI comprises a location parameter of a non-terrestrial network (NTN) device,
- wherein at least one of a field valueTag corresponding to the SI or an updating label of the SI remains unchanged when the location parameter changes,
- wherein the updating label is in a short message from the network device,
- wherein the SI indicates time information of the location parameter, and wherein:
the SI includes the time information of the location parameter; or a predetermined time point of a SI window carrying the SI indicates the time information of the location parameter.

10. The communication apparatus according to claim 9, wherein the location parameter of the NTN device comprises: a location of the NTN device; or a location of the NTN device and motion information of the NTN device.

11. The communication apparatus according to claim 9, wherein the location parameter of the NTN device comprises an Earth-centered, Earth-fixed coordinate system ECEF-based location parameter of the NTN device.

12. The communication apparatus according to claim 9, wherein the system information further comprises a common timing advance (TA) and change information of the common TA.

13. The communication apparatus according to claim 12, wherein the change information of the common TA comprises at least one of a change rate of the common TA or a derivative of the change rate of the common TA.

14. The communication apparatus according to claim 12, wherein the common TA, change information of the common TA, the location parameter of the NTN device, and the time information of the location parameter are used for determining a timing advance of uplink data transmission.

15. A non-transitory computer-readable storage medium having stored thereon computer-executable instructions that, when executed by a processor, cause a terminal device to:
receive system information (SI) from a network device,
wherein the SI comprises a location parameter of a non-terrestrial network (NTN) device, wherein at least one of a field valueTag corresponding to the SI or an updating label of the SI remains unchanged when the location parameter changes, wherein the updating label is in a short message from the network device, wherein the SI indicates time information of the location parameter, and wherein: the SI includes the time information of the location parameter; or a predetermined time point of a SI window carrying the SI indicates the time information of the location parameter.

16. The non-transitory computer-readable storage medium according to claim 15, wherein the location parameter of the NTN device comprises: a location of the NTN device or a location the NTN device and motion information of the NTN device.

17. The non-transitory computer-readable storage medium according to claim 15, wherein the location parameter of the NTN device comprises an Earth-centered, Earth-fixed coordinate system ECEF-based location parameter of the NTN device.

18. The non-transitory computer-readable storage medium according to claim 15, wherein the system information further comprises a common timing advance (TA) and change information of the common TA.

19. The non-transitory computer-readable storage medium according to claim 18, wherein the change information of the common TA comprises at least one of a change rate of the common TA or a derivative of the change rate of the common TA.

20. The non-transitory computer-readable storage medium according to claim 18, wherein the common TA, change information of the common TA, the location parameter of the NTN device, and the time information of the location parameter are used for determining a timing advance of uplink data transmission.

* * * * *